Jan. 26, 1971    S. O. HOWICK    3,557,535
AIR WASHER
Filed Nov. 25, 1968    3 Sheets-Sheet 1
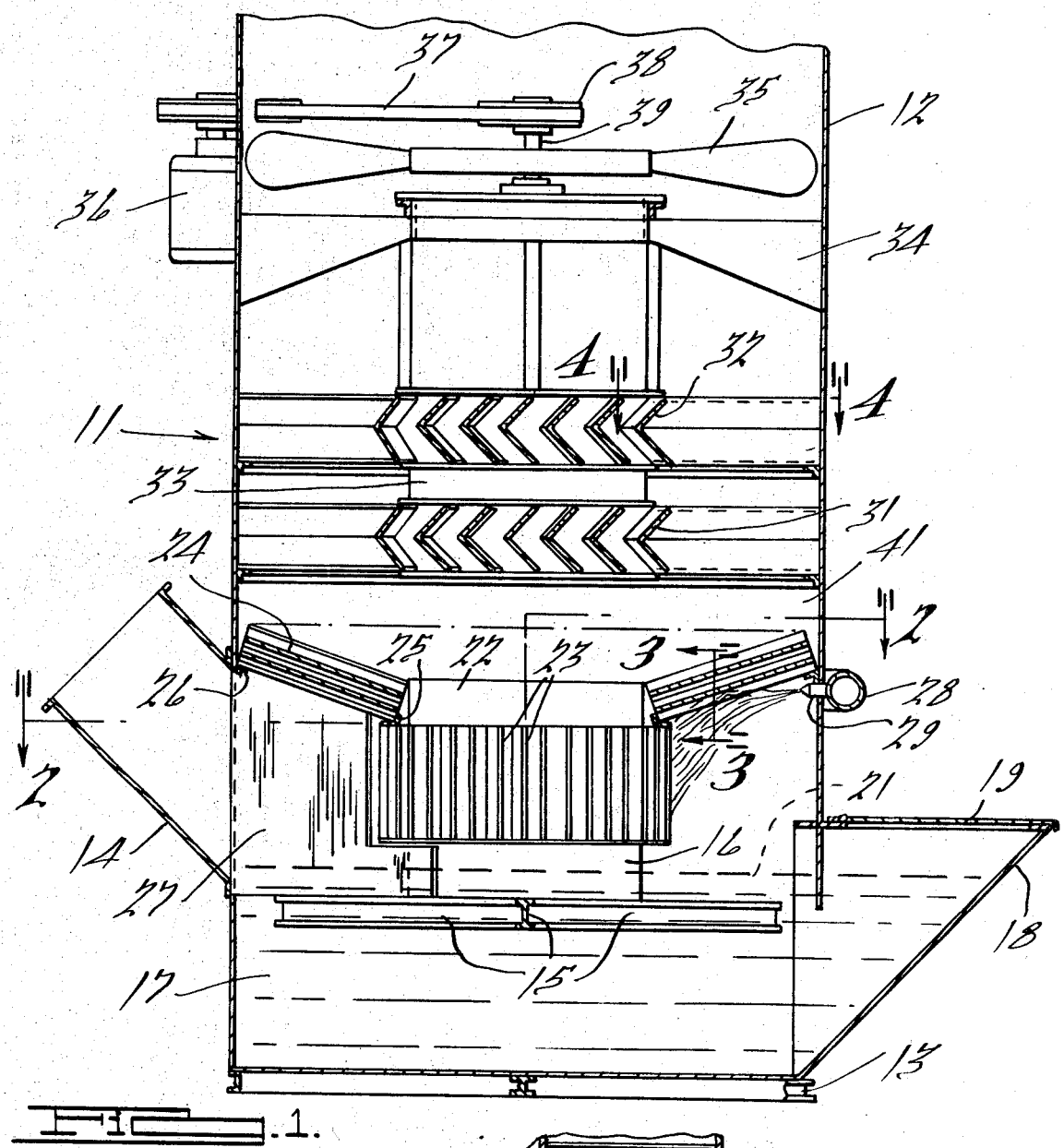
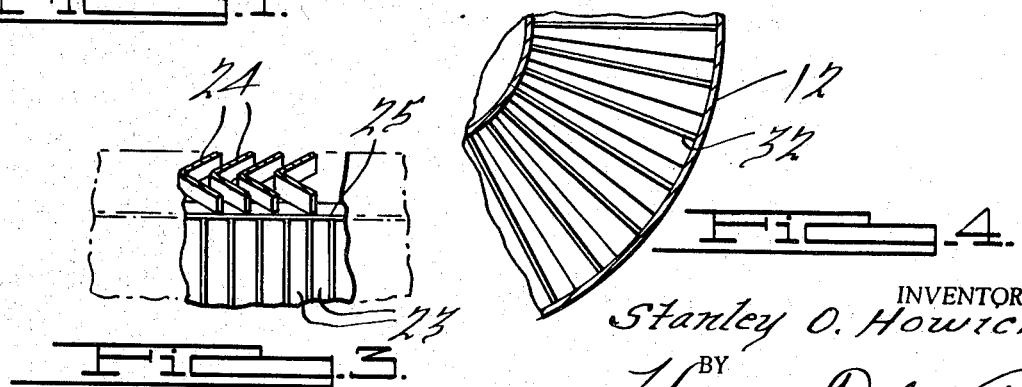
INVENTOR.
Stanley O. Howick
BY
Harness, Dickey & Pierce
ATTORNEYS

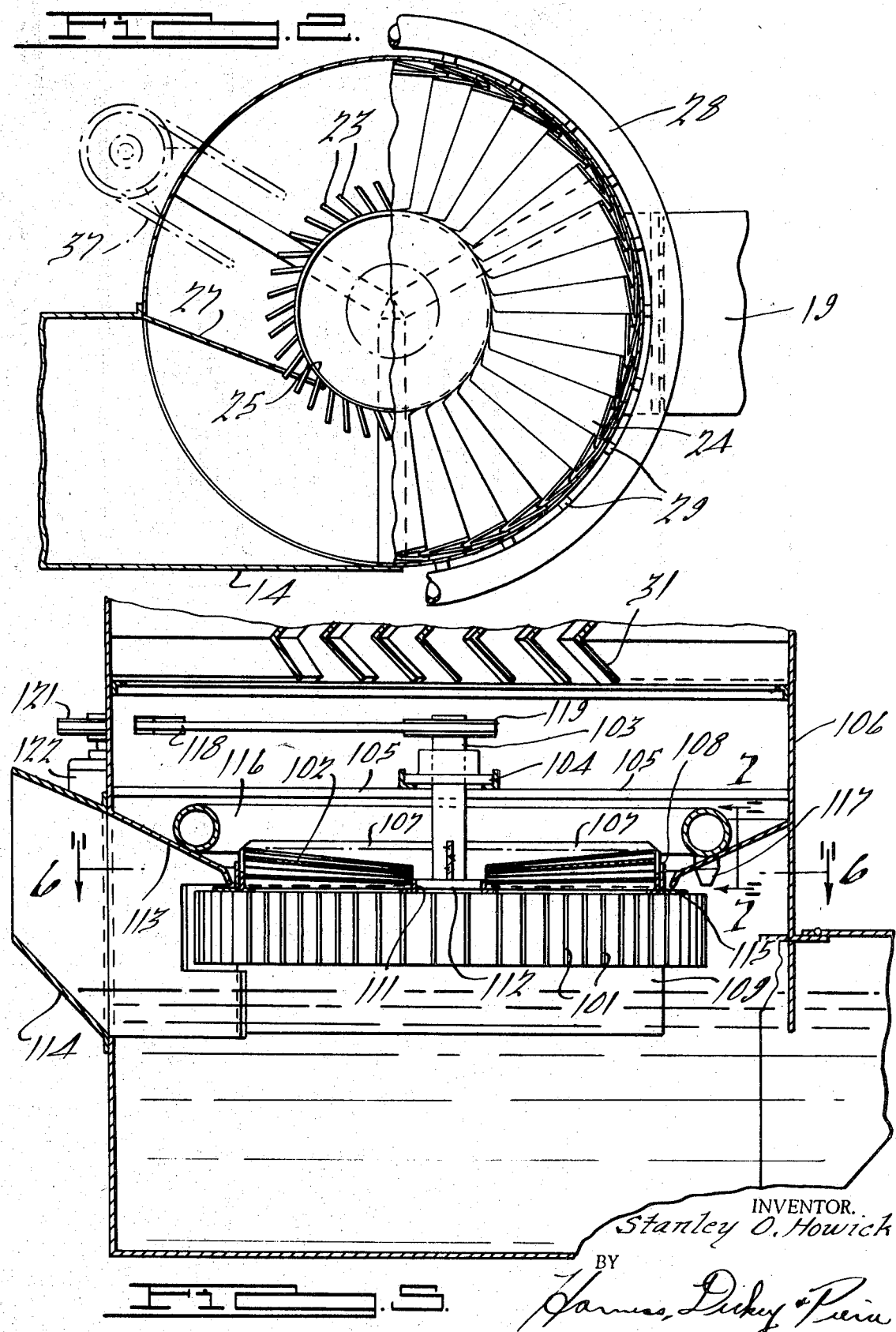

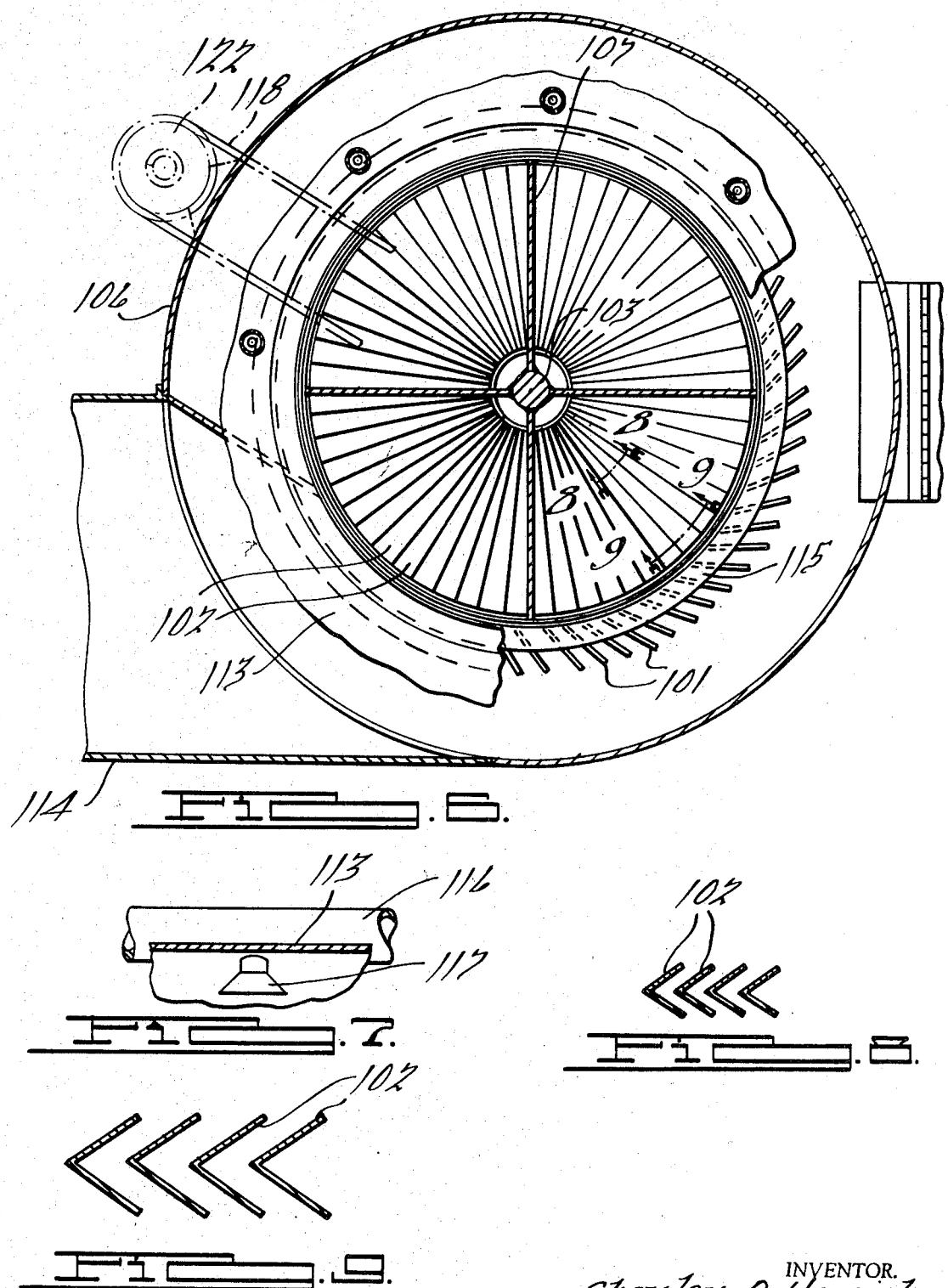

United States Patent Office 3,557,535
Patented Jan. 26, 1971

3,557,535
AIR WASHER
Stanley O. Howick, Union Lake, Mich., assignor to Poma, Inc., Detroit, Mich., a corporation of Michigan
Filed Nov. 25, 1968, Ser. No. 778,541
Int. Cl. B01d 47/00
U.S. Cl. 55—237         5 Claims

ABSTRACT OF THE DISCLOSURE

An industrial air washer has a vertical cylindrical housing. Circularly arranged vertical impingement baffles and radially extending impingement baffles with V-shaped cross sections are constantly sprayed with water. Air is drawn through the housing and impinges on these baffles, the water trapping foreign particles and washing them down to a pool at the bottom. The air rises through a series of moisture eliminators, being drawn upwardly by a fan. In a second embodiment, the baffles are constantly rotated.

BACKGROUND OF THE INVENTION

(1) Field of the invention

The invention relates to industrial air washers used to remove particulate matter from ventilating system air in operations such as polishing, buffing, plating, and other foundry and machinery processes.

(2) Description of the prior art

Some previous air cleaning methods include the spraying of large volumes of water into the air, passing the air through a body of wetted objects such as marbles and orifice type washers in which the water is drawn through small openings as a spray.

SUMMARY OF THE INVENTION

According to the invention, water is not sprayed into the air, but instead the air is caused to flow at relatively rapid rates against and past a series of impingement baffles which are kept constantly wetted, so that the foreign matter entrained in the air is trapped by the films of moisture on the baffles and is washed down into a collecting pool. The air is drawn through a vertical cylindrical housing in the lower portion of which is a circularly arranged series of angularly disposed vertical impingement baffles, the air flowing inwardly past these baffles which are constantly sprayed with water. Some of the air, instead of going through these baffles, goes through a series of radially extending circularly arranged nested impingement baffles having V-shaped cross sections, which are likewise sprayed with water. The air having passed through the impingement baffles flows through a series of moisture eliminators which are constructed similarly to the impingement baffles in two annular sets arranged in tandem. A fan mounted at the top of the housing draws the air through the housing and discharges it upwardly into the ventilating system. The collecting pool may be cleaned out by a trap door.

In the first embodiment, the baffles are stationary, and the V-shaped baffles extend radially outwardly from the upper portions of the vertical baffles, the air flowing either through the vertical baffles or the V-shaped baffles. In the second embodiment, the baffles are mounted on a constantly rotating shaft and the V-shaped baffles are above and extend radially inwardly from the vertical baffles, all the air flowing through both sets of baffles.

BRIEF DESCRIPTION OF THE DRAWINGS

FIG. 1 is a cross-sectional view in elevation of an embodiment of the present invention;

FIG. 2 is a plan cross-sectional view taken along the line 2—2 of FIG. 1 and showing the impingement baffles;

FIG. 3 is a fragmentary cross-sectional view taken along the ilne 3—3 of FIG. 1 and showing the nested relation of the V-shaped impingement baffles;

FIG. 4 is a fragmentary cross-sectional plan view taken along the line 4—4 of FIG. 1 and showing the arrangement of one of the moisture eliminator baffle sets;

FIG. 5 is a cross-sectional view in elevation of the lower portion of another embodiment of the invention in which the impingement baffles rotate;

FIG. 6 is a plan cross-sectional view of the embodiment of FIG. 5, taken along the line 6—6 thereof;

FIG. 7 is a fragmentary elevational view in cross section taken along the line 7—7 of FIG. 5 and showing the shape of one of the water spray nozzles;

FIG. 8 is a fragmentary cross-sectional view in elevation taken along the line 8—8 of FIG. 6, and showing the cross-sectional shape of the V-shaped baffles at their narrower ends; and FIG. 9 is a view similar to FIG. 8 but showing the baffles at their wider ends.

DESCRIPTION OF THE PREFERRED EMBODIMENTS

Referring first to the embodiment of FIGS. 1 to 4, the air washer is generally indicated at 11 and comprises a vertical cylindrical housing 12 resting on a base 13. An air inlet duct 14 is provided above the lower end of housing 12, this duct extending at a downward angle as seen in FIG. 1 and chordally of the housing as seen in FIG. 2.

Three radially extending beams 15 are mounted in the lower portion of housing 12 and support a vertical cylindrical member 16 spaced substantially inwardly from housing 12. Member 16 acts as a seal, a water collecting pool 17 normally filling the lower portion of housing 12 above the bottom of seal 16, this water level being about the lower end of the entrance provided by duct 14. A cleanout bin 18 is provided on the side of housing 12 opposite air inlet 14, this bin having an upwardly sloping wall with a trap door 19 at the top of the bin above the level 21 of pool 17.

Another cylindrical member 22 is spaced above member 16 and a plurality of vertical impingement baffles 23 extend between these two cylindrical members. Baffles 23 comprise flat plates which extend chordally with respect to rings 16 and 22. The angle to which plates 23 are set is similar and their length relative to their spacing is such that they will overlap as seen in FIG. 2. The impingement baffles in the vicinity of entrance duct 14 point away from this entrance duct, the entire set of plates being at about the level of duct 14. The air flowing into housing 12 from the duct will therefore tend to pass circumferentially around the housing and will be drawn radially inwardly against and past impingement baffles 23 by means later described.

A series of impingement baffles 24 with V-shaped cross sections extend radially outwardly from the upper ends of baffles 23 to the wall of housing 12. The inner ends of baffles 24 rest on angular members 25 atop baffles 23, and their outer ends rest on brackets 26 secured to the inside of the housing 12. As seen in FIG. 3, baffles 24 have a moderate included angle, the optimum angle having been found to be within the range of 30° to 66°. Baffles 24 are in nested relation so as to achieve the proper baffle effect without inordinately increasing resistance to flow. Satisfactory nesting requires a patch or spacing between adjacent baffles of about 25% to 70% of the horizontal dimension of baffles 24. The V-shaped baffles are inclined upwardly and outwardly, as seen in FIG. 1, and a deflector wall 27 extends below these baffles adjacent the entrance of duct 14 into the housing. This wall, as seen in FIG. 2, will cause flow of air in a counterclockwise direction, and the V-shaped baffles are arranged so that their open sides face in the direction of air flow, which will thus have to reverse sharply in order to pass through baffles 24. As already pointed out, sharp reversal of air flow is also required to pass through baffles 23.

A water distributing header 28 is mounted on the outside of housing 12 and has nozzles 29 passing through the housing at closely spaced angular intervals. During operation these nozzles will spray water in the pattern indicated in FIG. 1 so that baffles 23 and 24 will be constantly covered by a film of water.

A series of V-shaped moisture eliminator baffles 31 are mounted above baffles 24, and a second series of such baffles 32 are mounted above baffles 31. These two sets of baffles are arranged in annular areas within housing 12 and are generally of the same construction as the impingement baffles although they are wider. The inner ends of the moisture eliminator baffles are secured to a cylindrical member 33 which extends upwardly through the housing and is supported by a series of gusset plates 34 attached to the housing. A fan 35 is mounted above gusset plate 34 and is driven by an electric motor 36 through a belt drive 37. Motor 36 is mounted outside the housing and the belt drive leads to a pulley 38 on the upper end of the fan shaft 39.

In operation of the embodiment of FIGS. 1 to 4, fan 35 will draw air through inlet 14 and around housing 12 in a counterclockwise direction, as seen in FIG. 2. The air will strike impingement baffles 23 and 24 which have a water film, and the entrained foreign matter will be trapped by this water and flow downwardly with it into pool 17. Meanwhile, the air will pass through the impingement baffles and into a free area 41 above the baffles where the air will have a relatively low velocity. The air will then flow through moisture eliminator baffles 31 and 32 which will remove some of the entrained water particles, and will then be discharged upwardly by fan 35.

An industrial air washer is thus provided which is extremely compact, has relatively low power requirements and will still provide highly efficient air cleaning. The unit has a relatively low pressure drop from inlet to discharge and also has low maintenance cost. Moisture eliminator baffles 31 and 32 will also serve an additional function with regard to foreign matter removal, adding to the efficiency of the unit.

Referring now to the embodiments of FIGS. 5 through 9, only the lower portion of this embodiment is shown, since the upper portion including moisture eliminators 31 and 32 and fan 35 will be the same as in the previous embodiment. In this case, however, vertical impingement baffles 101 and V-shaped impingement baffles 102 are carried by a rotatable shaft 103. This shaft is supported by a thrust bearing 104 which rests on radially extending members 105 secured to the inside of housing 106. A plurality of gusset plates 107 extend radially outwardly from shaft 103 below members 105, and support a ring 108 of angular cross-sectional shape at their outer ends. Vertical impingement baffles 101 are secured at their upper edges to member 108 and at their lower edges to a ring 109 similar to ring 16 of the previous embodiment.

V-shaped impingemnt baffles 102 extend radially inwardly from baffles 101, as seen in FIG. 6. These baffles are relatively narrow at their inner end and relatively wide at their outer end, as seen in FIGS. 8 and 9 respectively, but otherwise have the same dimensions described above with respect to baffles 24. The inner ends of baffles 102 rest on an inner ring 111 of angular cross-sectional shape which surrounds a disk 112 at the bottom of shaft 103. The outer ends of baffles 102 rest on member 108.

An annular deflector plate 113 is provided in housing 12 for insuring that all the air flows through baffles 101 and 102. This plate is immediately above inlet duct 114 to housing 106 and slopes downwardly and inwardly, its inner edge being closely adjacent a circular member 115 of angular cross-sectional shape which is secured to the outer ends of gussets 107. A water distributing header 116 is mounted immediately above deflector plate 113 and has a series of closely spaced nozzles 117 penetrating plate 113, as seen in FIG. 5. These nozzles flare in a circumferential direction as seen in FIG. 7 so that the spray will coat baffles 101 with a film of water as the baffles rotate beneath the nozzles. Shaft 103 is driven by a belt 118 extending between a pulley 119 on shaft 103 and a pulley 121 on the shaft of a motor 122 mounted outside the housing 106.

Housing 106 extends above frames 105 and, although not shown in FIG. 5, the unit will contain several sets of moisture eliminator baffles 31 and 32 as well as a fan 35 at the upper end of the housing driven by motor 36.

In operation of the embodiment of FIGS. 5 through 9, baffles 101 and 102 will be constantly rotated by motor 122 during the time air is drawn from duct 114 through the unit. The speed of rotation, which may be chosen to suit requirements, will create an additional impingement action as the air to be cleaned passes through baffles 101 and 102. The air will then pass through moisture eliminator baffles 31 and 32 and fan 35, as before.

It should be noted that in both embodiments of the invention, although the main function of the water spray is to maintain a constant film of water on the impingement baffles, the spray will have some effect in washing the air.

What is claimed is:

1. An air washer comprising a vertical cylindrical housing, an annular series of spaced vertical impingement baffles in said housing, said baffles extending coaxially with respect to said housing axis, means for guiding air into said housing to move in a circular direction, whereby the air will impinge on said baffles when passing between them, a second annular set of impingement baffles extending radially from first set of baffles to the housing, said second set of impingement baffles having a V-shaped cross section, being arranged in nested relation, and being so positioned that air must pass upwardly across the V and thereby reverse its flow, means for maintaining a constant film of water on both sets of impingement baffles whereby foreign material entrained in the air impinging on said baffles will be trapped by the water and washed to the bottom of the housing, a collection pool in the lower end of said housing, a ring extending downwardly from said first set of impingement baffles into said water to provide a seal preventing bypass of said baffles, eliminator baffles in said housing above said impingement baffles to remove moisture from said air, means for drawing air to be cleaned successively through said impingement baffles and said moisture eliminator baffles, and an outlet in said housing downstream of said eliminator baffles.

2. The combination according to claim 1, said moisture eliminator baffles extending radially in an annular space above said impingement baffles.

3. The combination according to claim 1, said moisture eliminator baffles being of V-shaped cross section.

4. The combination according to claim 1, the V-shaped baffles being arranged so that the open sides face in the direction of air flow.

5. The combination according to claim 4, said V-shaped baffles having included angles of between 30° and 66° and having a pitch of between 25% to 70% of the horizontal length of the baffles.

References Cited

UNITED STATES PATENTS

| | | | |
|---|---|---|---|
| 1,894,744 | 1/1933 | Hawley | 261—79.1 |
| 2,142,747 | 1/1939 | Fisher | 261—79.1 |
| 2,143,628 | 1/1939 | Lea | 55—230 |
| 2,157,416 | 5/1939 | Kjos | 55—230 |
| 2,496,281 | 2/1950 | Fischer | 261—79.1 |
| 2,796,241 | 6/1957 | Lhota | 261—91 |
| 3,307,334 | 3/1967 | Jamison et al. | 55—257 |
| 3,323,290 | 6/1967 | Stern | 55—238 |
| 3,328,009 | 6/1967 | Panzica et al. | 261—118 |
| 3,412,529 | 11/1968 | Tailor | 261—79.1 |

FRANK W. LUTTER, Primary Examiner

B. NOZICK, Assistant Examiner

U.S. Cl. X.R.

55—241, 440; 261—79